US008676471B2

(12) United States Patent
Catanese et al.

(10) Patent No.: US 8,676,471 B2

(45) Date of Patent: Mar. 18, 2014

(54) METHOD FOR DETERMINING AN INDEX OF THE FUEL COMBUSTION IN AN ENGINE CYLINDER

(75) Inventors: Alessandro Catanese, Orbassano (IT); Fabio Autieri, Turin (IT); Claudio Monferrato, Rondissone (IT)

(73) Assignee: GM Global Technology Operations LLC, Detroit, MI (US)

( * ) Notice: Subject to any disclaimer, the term of this patent is extended or adjusted under 35 U.S.C. 154(b) by 811 days.

(21) Appl. No.: 12/914,807

(22) Filed: Oct. 28, 2010

(65) Prior Publication Data

US 2011/0125388 A1 May 26, 2011

(30) Foreign Application Priority Data

Nov. 3, 2009 (GB) .................................. 0919309.5

(51) Int. Cl.

| | |
|---|---|
| ***G01M 15/08*** | (2006.01) |
| ***G01L 23/30*** | (2006.01) |
| ***F02B 77/08*** | (2006.01) |
| ***F02D 35/02*** | (2006.01) |
| ***F02D 45/00*** | (2006.01) |

(52) U.S. Cl.
USPC .......................................... 701/103; 123/435

(58) Field of Classification Search
USPC .................................. 701/103, 104; 123/435
See application file for complete search history.

(56) References Cited

U.S. PATENT DOCUMENTS 4,905,648 A 3/1990 Washino et al.
5,544,635 A 8/1996 Hara et al.
(Continued)

FOREIGN PATENT DOCUMENTS

EP 1900927 A1 3/2008
EP 1953368 A2 8/2008
(Continued)

OTHER PUBLICATIONS

British Patent Office, Search Report for British Application No. GB0919309.5, dated Jan. 21, 2010.

*Primary Examiner* — Stephen K Cronin
*Assistant Examiner* — Arnold Castro
(74) *Attorney, Agent, or Firm* — Ingrassia Fisher & Lorenz, P.C.

(57) ABSTRACT

A method is provided for determining an index representing the crank angle at which a given fuel mass fraction has been burnt in a cylinder of the engine during an engine cycle. The method includes, but is not limited to sampling the pressure within the cylinder during the engine cycle, using the pressure samples for determining the heat release rate curve during the engine cycle, using the heat release rate curve for determining the cumulative heat release curve during the engine cycle, determining a minimum value and a maximum value of the cumulative heat release curve, using the given fuel mass fraction for calculating a target value of the cumulative heat release between the minimum and maximum values, finding a goal point of the cumulative heat release curve that corresponds to the target value, assuming the crank angle corresponding to the goal point as the index. The method further includes, but is not limited to determining an opening angle within the crank angular range corresponding to compression stroke of the engine cycle, determining a closing angle within the crank angular range corresponding to the expansion stroke of the engine cycle, using the opening and closing angles for delimiting between them a first angular window, and limiting the determination of the minimum and maximum values of the cumulative heat release curve within the first angular window.

20 Claims, 10 Drawing Sheets

(56) References Cited

U.S. PATENT DOCUMENTS

| | | | | |
|---|---|---|---|---|
| 6,840,218 | B2 * | 1/2005 | Scholl et al. | 123/435 |
| 7,440,841 | B2 | 10/2008 | Ripley | |
| 7,454,286 | B2 * | 11/2008 | Sinnamon et al. | 123/435 |
| 7,870,846 | B2 * | 1/2011 | Weissenborn et al. | 123/435 |
| 2003/0010101 | A1 | 1/2003 | Zur Loye et al. | |
| 2003/0145829 | A1 * | 8/2003 | Scholl et al. | 123/435 |
| 2005/0005902 | A1 | 1/2005 | Vermonet et al. | |
| 2005/0145219 | A1 | 7/2005 | Raichle et al. | |
| 2005/0274358 | A1 | 12/2005 | Kohira et al. | |
| 2006/0106523 | A1 | 5/2006 | Ancimer | |
| 2008/0053405 | A1 * | 3/2008 | Vigild et al. | 123/435 |
| 2009/0259383 | A1 | 10/2009 | Wang et al. | |

FOREIGN PATENT DOCUMENTS

| | | | |
|---|---|---|---|
| FR | 2909413 | A1 | 6/2008 |
| JP | 56124673 | A | 9/1981 |
| JP | 2009197672 | A | 9/2009 |

* cited by examiner

METHOD FOR DETERMINING AN INDEX OF THE FUEL COMBUSTION IN AN ENGINE CYLINDER

CROSS-REFERENCE TO RELATED APPLICATION

This application claims priority to British Patent Application No. 0919309.5, filed Nov. 3, 2009, which is incorporated herein by reference in its entirety.

TECHNICAL FIELD

The technical field relates to a method for determining an index representing a crank angle at which a given fuel mass fraction has been burnt into a cylinder of an internal combustion engine, in particular of a Diesel engine.

BACKGROUND

It is known to control the injection of fuel in each cylinder of a Diesel engine using a closed-loop control of a parameter representative of the fuel combustion in the engine cylinders, in order to stabilize the combustion and reduce polluting emission. One of the mostly used parameter in controlling the combustion of a Diesel engine is an index which represents the crank angle, at which a given mass fraction of the fuel injected in the cylinder during an engine cycle has been burnt. As a matter of fact, said index typically indicates the crank angle at which 50% of the injected fuel mass has been burnt into the cylinder, so that it is generally referred as MFB50 (Mass Fraction Burnt 50%).

The determination of such index requires the ECU to sample the pressure within the cylinder during an engine cycle, in order to acquire an in-cylinder pressure curve. The pressure is sampled by means of a pressure sensor set inside the cylinder, typically integrated in the glow plug associated to the cylinder itself.

The ECU uses the in-cylinder pressure curve for calculating a curve representing the heat release rate during said engine cycle, according to the equation:

$$\frac{dQ}{d\alpha} = \frac{k}{k-1} \cdot P \cdot \frac{dV}{d\alpha} + \frac{1}{k-1} \cdot V \cdot \frac{dP}{d\alpha} \qquad (1)$$

Where Q represents the heat, P represents the in-cylinder pressure, V represents the volume of the combustion chamber defined by the piston within the cylinder, k is the specific heat ratio (the ratio between the specific heat constants for constant pressure and constant volume processes) and a represents the crank angle.

The heat release rate curve is then integrated by the ECU according to the equation:

$$Q = \frac{1}{k-1} \cdot \int \left( k \cdot P \cdot \frac{dV}{d\alpha} + V \cdot \frac{dP}{d\alpha} \right) \cdot d\alpha \qquad (2)$$

in order to achieve a curve representing the cumulative heat release during the engine cycle.

At this point, the ECU determines the minimum and the maximum value of the cumulative heat release curve, and uses the given fuel mass fraction (50% in the case of MFB50 determination), for calculating a target value of the cumulative heat release between said minimum and maximum values, according to the equation:

$$Tv = mv + f(Mv - mv) \qquad (3)$$

Where Tv is the target vale, my and My are respectively the minimum and maximum value of the cumulative heat release curve, and f is a fraction corresponding to the given fuel mass fraction.

Finally, the ECU finds the goal point of the cumulative heat release curve which corresponds to the target value Tv, and assumes as index the crank angle corresponding to the goal point.

A drawback of this method is that the sampled in-cylinder pressure curve may be affected by some noises due to pressure sensor wiring, or to electrical interferences between the pressure sensor and other components of the engine system, such as for example the glow plug and the actuator of the injector. These noises manifest themselves in form of variations of the pressure curve, which locally deviates from the expected trace and rapidly returns to it.

It follows that the pressure rate dP/dα in the neighborhood of said noises is quite high and therefore, according to equation (2), it produces an unexpected fluctuation in the heat release rate curve having high amplitude. Such fluctuation is further magnified if the pressure noise is located in a portion of the pressure curve corresponding to a phase of the engine cycle in which also the combustion chamber volume rate dV/dα is high. According to equation (3), each unexpected fluctuation of the heat release rate curve produces in turn a fake spike in the cumulative heat release curve, which can stick out from the expected trace either upward or downward. These fake spikes can imply several problems in the determination of the MFB50, as well as of any other index representing a crank angle at which a given quantity of injected fuel mass has been burnt into the cylinder.

A first problem consists in that the vertex of a fake spike could actually be the minimum or the maximum value of the cumulative heat release curve. In this case, the presence of the fake spike introduces an error in calculating the target value Tv, which results in a deviation of the determined index with respect to the real one.

Even if the target value Tv was correct, a second problem consists in that a fake spike could have one or more points corresponding to the target value Tv. In this case, it is generally not possible for the conventional system to effectively distinguish the goal point of the cumulative heat release curve from the points belonging to the fake spike, so that said conventional system could find a wrong goal point, which inevitably returns an index different from the real one.

In view of the foregoing, at least one object of the present invention is to solve, or at least to positively reduce the above mentioned drawbacks, in order to achieve an index which is more reliable than that provided by the conventional system. At least another object of the present invention is to meet the above mentioned object with a simple, rational and inexpensive solution. In addition, other objects, desirable features, and characteristics will become apparent from the subsequent summary and detailed description, and the appended claims, taken in conjunction with the accompanying drawings and this background.

SUMMARY

A method is provided for determining an index representing the crank angle at which a given fuel mass fraction has been burnt in a cylinder of an internal combustion engine during an engine cycle, wherein said determining method generally comprises the steps of: sampling the pressure within the cylinder during the engine cycle, using the pressure samples for determining the heat release rate curve during the engine cycle, using said heat release rate curve for determining the cumulative heat release curve during said engine cycle, determining a minimum value and a maximum value of said cumulative heat release curve, using the given fuel mass fraction for calculating a target value of the cumulative heat release between said minimum and maximum values finding a goal point of the cumulative heat release curve which corresponds to said target value, and assuming the crank angle corresponding to said goal point as the index.

The method provides for determining an opening angle within the crank angular range corresponding to compression stroke of the engine cycle, determining a closing angle within the crank angular range corresponding to the expansion stroke of the engine cycle, using said opening and closing angles for delimiting between them a first angular window, and limiting the determination of the minimum and maximum values of the cumulative heat release curve within said first angular window. In this way, the fake spikes which are eventually located outside said first angular window are disregarded, and do not affect the determination of minimum and maximum value.

According to an embodiment of the invention, in case of Diesel engine, the opening angle shall be as late as possible but before the start of the first fuel injection, and the closing angle shall be as early as possible but after the end of the last fuel injection. In case of Spark ignited engine, the opening angle shall be as late as possible but before the spark angle, and the closing angle shall be as early as possible but after the spark angle.

The method further provides for determining a lower point of the cumulative heat release curve which corresponds to the determined minimum value, determining a upper point of the cumulative heat release curve which corresponds to the determined maximum value, and limiting the finding of the goal point within the portion of the cumulative heat release curve which is comprised between said lower and upper point. In this way, the fake spikes which are eventually located outside the considered portion of the cumulative heat release curve do not affect the finding of the goal point, even if such fake spikes have one or more points corresponding to the target value.

According to another embodiment, the finding of the goal point comprises the step of: determining a lower point of the cumulative heat release curve which corresponds to the determined minimum value, determining a upper point of the cumulative heat release curve which corresponds to the determined maximum value, evaluating the points of the cumulative heat release curve in sequence from the lower point towards the upper point, determining the first point of the sequence which corresponds to the target value, and assuming such first point as the goal point. This finding procedure is based on the assumption that the cumulative heat release curve is monotonic and increasing from the minimum to the maximum value.

The assumption is theoretically valid, since the portion of the cumulative heat release curve between the minimum and maximum values generally comprises the combustion phase of the fuel in the cylinder, so that it is not plausible for the heat release to decrease in this phase. By applying the finding procedure in question, it is effectively possible to reduce the ECU computing load and the operating time for achieving the goal point, because the step of evaluating the cumulative heat release curve can be interrupted after the detection of the first point corresponding to the target vale, to thereby disregarding all the other.

Moreover, the finding procedure in question returns always a single goal point, even if a fake spike is located in the portion of the cumulative heat release curve between the minimum and maximum, to at least avoiding any uncertainty in the decision about which point should be considered as the right one.

According to another embodiment of the invention, the method comprises the steps of determining a lower point of the cumulative heat release curve which corresponds to the determined minimum value, determining a upper point of the cumulative heat release curve which corresponds to the determined maximum value, determining the crank angle corresponding to said lower point of the cumulative heat release curve, determining the crank angle corresponding to said upper point of the cumulative heat release curve, and checking whether the crank angle corresponding to said lower point precede the crank angle corresponding to said upper point or not.

If the crank angle corresponding to lower point does not precede the crank angle corresponding to upper point, it means that the determined cumulative heat release curve is wrong, since it is not theoretically plausible that the heat release decreases during the fuel combustion. In this latter case, the method preferably provides for aborting the normal determination of the index and for performing instead a special procedure. Such special procedure can assign to the index a default crank angle, or can assign to the index the crank angle at which the same given fuel mass fraction has been burnt in the cylinder during a previous engine cycle.

According to another embodiment of the invention, the method further comprises the step of determining an intermediate angle within the first angular window and within the crank angular range corresponding to the expansion stroke of the engine cycle, using said intermediate angle and the closing angle of the first angular window for delimiting between them a second angular window, determining a not positive threshold for the heat release rate, evaluating the portion of the heat release rate curve comprised within said second angular window, and checking whether at least one point of said portion of the heat release rate curve corresponds to a value beneath said not positive threshold or not.

If one or more points of said portion of the heat release rate curve correspond to values beneath said not positive threshold, it means that a fake spike is located within the second angular window and therefore that the determination of the index is probably affected by an error. In fact, a fake spike in the cumulative heat release curve always comprises a sharp heat release increase which is followed or anticipated by a sharp heat release decrease. To any heat release decrease there are corresponding negative values of the heat release rate. Therefore, a fake spike located in the second angular window manifest itself with at least a negative value of the heat release rate. However, the second angular window corresponds to the combustion phase of the fuel within the cylinder, and it is not theoretically plausible to have a negative value of the heat release rate in this phase. In this latter case, the method preferably provides for aborting the normal determination of the index and for performing instead a special procedure. Such special procedure can assign to the index a default crank angle, or can assign to the index the crank angle at which the same given fuel mass fraction has been burnt in the cylinder during a previous engine cycle.

According to an embodiment of the present embodiment, the intermediate angle which defines the second angular window is comprised between the TDC angle between the compression stroke and expansion stroke and the closing angle of the first angular windows.

A wider method is also provided for controlling an internal combustion engine. The index determination method of the invention is repeated for each engine cycle during the engine functioning.

The methods according to the invention can be realized in the form of a computer program comprising a program-code to carry out all the steps of the methods of the invention and in the form of a computer program product comprising means for executing the computer program.

The computer program product comprises, according to a preferred embodiment of the invention, a control apparatus for an internal combustion engine, for example an engine microprocessor based controller ECU, in which the program is stored so that the control apparatus defines the invention in the same way as the method. In this case, when the control apparatus execute the computer program all the steps of the method according to the invention are carried out.

The methods according to the invention can be also realized in the form of an electromagnetic signal, said signal being modulated to carry a sequence of data bits which represent a computer program to carry out all steps of the methods of the invention.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

The embodiments of the invention are hereinafter disclosed with reference to a four-stroke Diesel engine. A method is provided for determining an index (MFB50 in the present embodiment) representing the crank angle at which a given fuel mass fraction has been burnt into a cylinder of the Diesel engine, during an engine cycle. In a four-stroke Diesel engine, each engine cycle is performed during two crankshaft rotations)(720°), which correspond, to four strokes of the piston into the cylinder: intake stroke, compression stroke, expansion stroke and exhaust stroke.

The fuel is injected into the cylinder during an injection phase which is performed across the top dead center (TDC) of the piston between compression and expansion stroke. Accordingly, the fuel combustion occurs approximately during the same phase or slightly later. The determination of the above mentioned index provides for sampling the pressure within the cylinder during the engine cycle.

Figure 1:
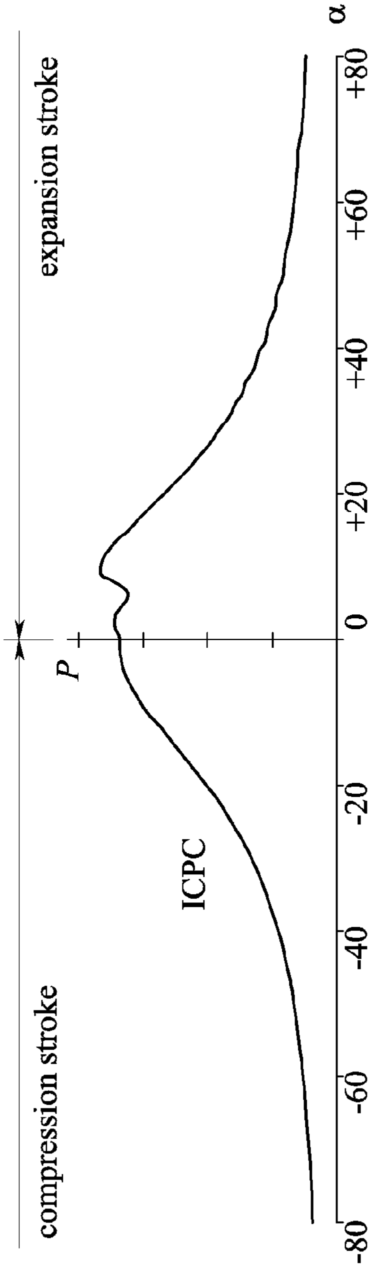
FIG. 1 shows an expected in-cylinder pressure curve of a Diesel engine cylinder.
Figure 2:
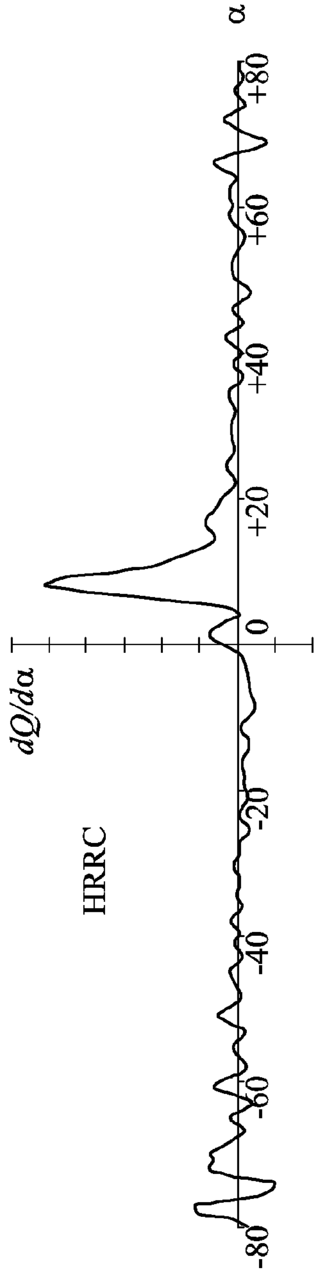
FIG. 2 shows the heat release rate curve corresponding to the in-cylinder pressure curve of FIG. 1.

The pressure is sampled by means of a pressure sensor set inside the cylinder, typically integrated in the glow plug associated to the cylinder itself. The pressure samples are used for determining the in-cylinder pressure curve ICPC during the engine cycle, as shown in FIG. 1. The in-cylinder pressure curve ICPC shown in FIG. 1 is that expected if no noise occurs during the sampling. The in-cylinder pressure curve ICPC is used for determining the heat release rate curve HRRC during the same engine cycle, as shown in FIG. 2.

The heat release rate curve HRRC is calculated according to the equation:

$$\frac{dQ}{d\alpha} = \frac{k}{k-1} \cdot P \cdot \frac{dV}{d\alpha} + \frac{1}{k-1} \cdot V \cdot \frac{dP}{d\alpha}$$

where Q represents the heat, P represents the in-cylinder pressure, V represents the volume of the combustion chamber defined by the piston within the cylinder, k is the specific heat ratio (the ratio between the specific heat constants for constant pressure and constant volume processes) and α represents the crank angle.

Figure 3:
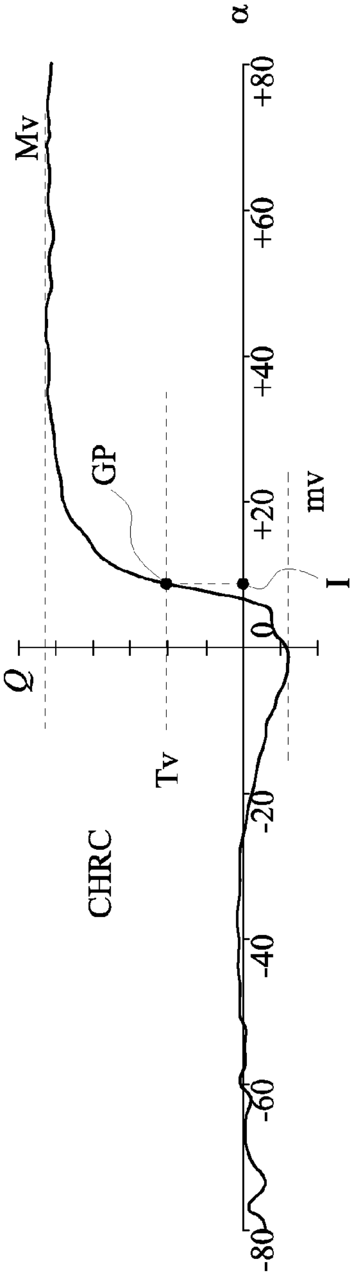
FIG. 3 shows the cumulative heat release curve corresponding to the heat release rate curve of FIG. 2.

The heat release rate curve HRRC is then used for determining the cumulative heat release curve CHRC during the same engine cycle, as shown in FIG. 3. The cumulative heat release curve CHRC is calculated by means of an integration according to the equation:

$$Q = \frac{1}{k-1} \cdot \int \left( k \cdot P \cdot \frac{dV}{d\alpha} + V \cdot \frac{dP}{d\alpha} \right) \cdot d\alpha.$$

For sake of simplicity, the in-cylinder pressure curve ICPC, the heat release rate curve HRRC and the cumulative heat release curve CHRC, are shown within a crank angular range comprised between −80° and +80°, wherein 0° corresponds to the crank angle at with the piston is at the TDC between combustion stroke and expansion stroke of the engine cycle.

At this point, the determination of the index provides for determining the minimum value my and the maximum value My of the cumulative heat release curve CHRC, and using the given fuel mass fraction f (50% in the present embodiment), for calculating a target value Tv of the cumulative heat release between said minimum and maximum values, according to the equation:

$$Tv = mv + f(Mv - mv)$$

Finally, the determination of the index provides for finding the goal point GP of the cumulative heat release curve CHRC which corresponds to said target value Tv, and assuming as index the crank angle I corresponding to said goal point GP.

The embodiments of the present invention improves this determining method, in order to return an index I which is less affected by noises on in-cylinder pressure curve ICPC, which can be generated by pressure sensor wiring or by electrical interferences between the pressure sensor and other components of the engine system, such as for example the glow plug and the actuator of the injector.

Figure 4:
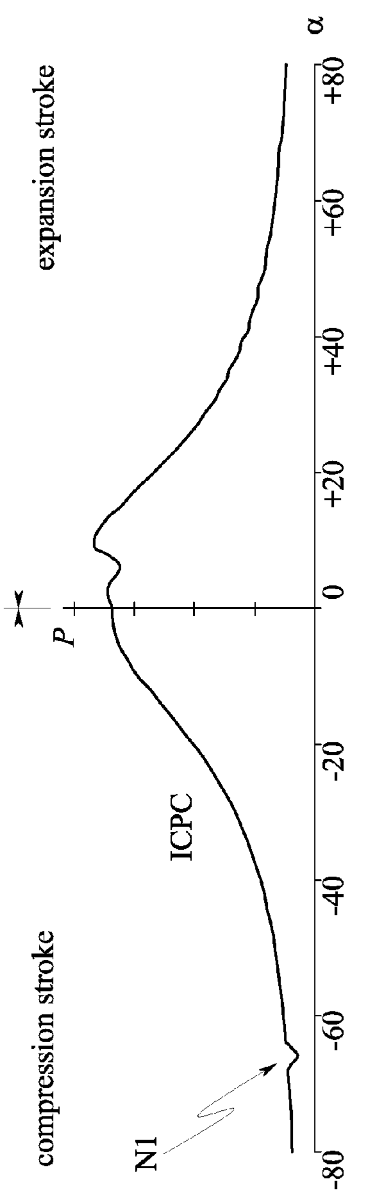
FIG. 4 shows an in-cylinder pressure curve of a Diesel engine cylinder affected by a noise located at the beginning of the compression stroke.
Figure 5:
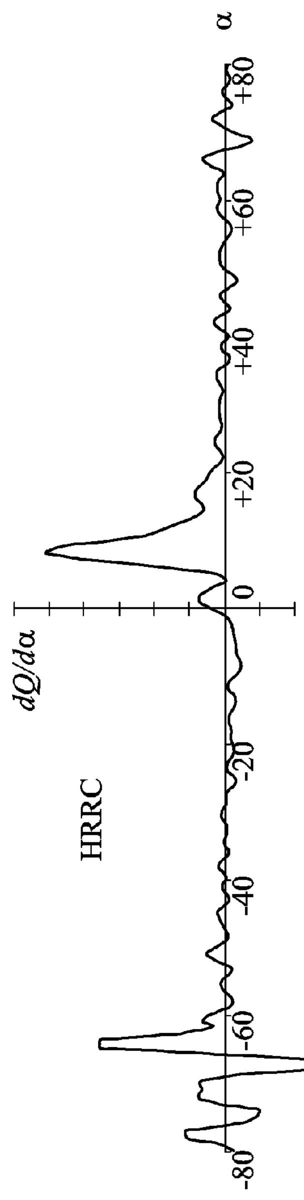
FIG. 5 shows the heat release rate curve corresponding to the in-cylinder pressure curve of FIG. 4.
Figure 6:
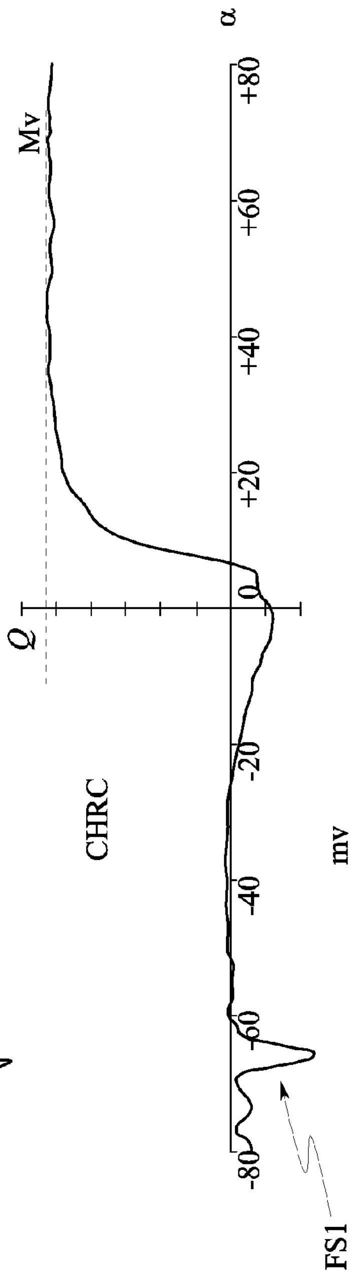
FIG. 6 shows the cumulative heat release curve corresponding to the heat release rate curve of FIG. 5.

For example, the in-cylinder pressure curve ICPC can be affected by a noise N1 located at the beginning of the compression stroke, as shown in FIG. 4. Such noise N1 would generate a downward fake spike FS1 on the cumulative heat release curve CHRC of FIG. 6, whose inferior vertex corresponds to the minimum value my of the cumulative heat release curve CHRC, to thereby introducing an error in calculating the target value Tv, and therefore a deviation of the determined index with respect to the real one.

Figure 7:
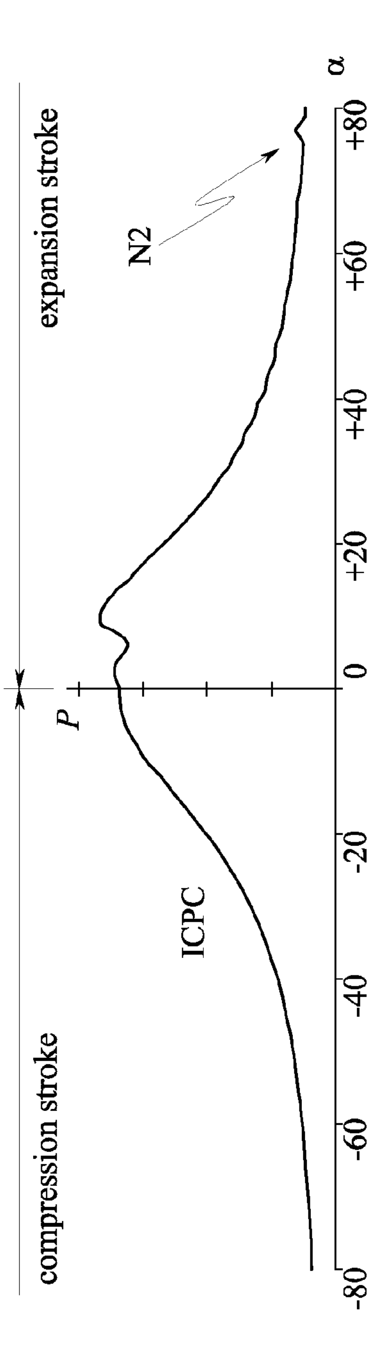
FIG. 7 shows an in-cylinder pressure curve of a Diesel engine cylinder affected by a noise located at the end of the expansion stroke.
Figure 8:
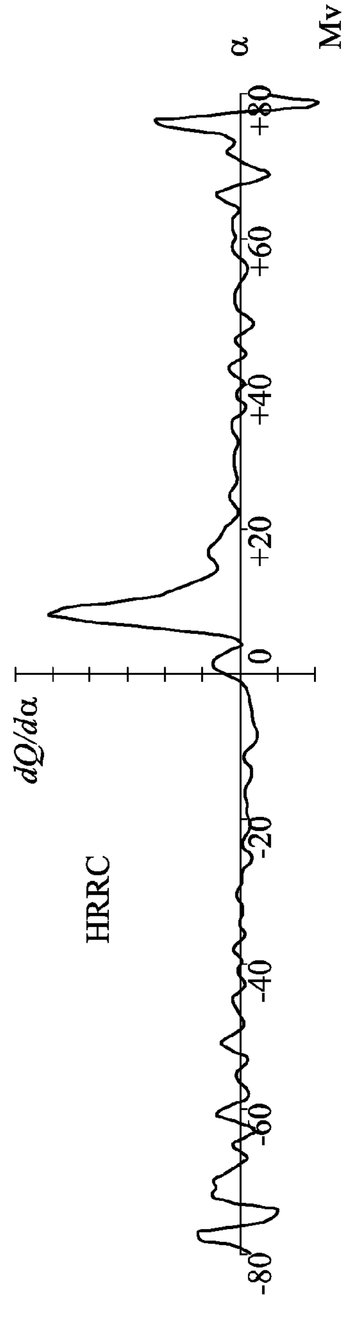
FIG. 8 shows the heat release rate curve corresponding to the in-cylinder pressure curve of FIG. 7.
Figure 9:
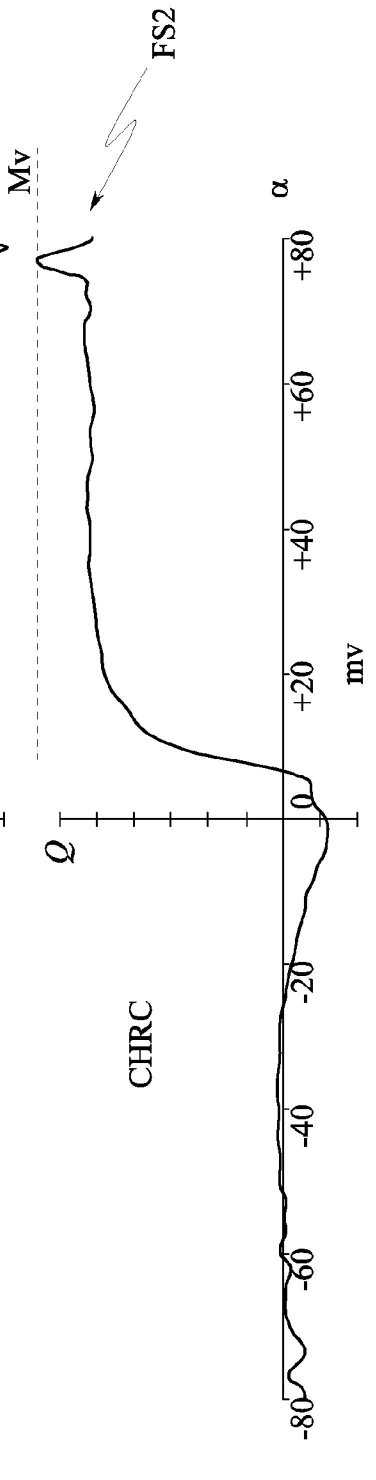
FIG. 9 shows the cumulative heat release curve corresponding to the heat release rate curve of FIG. 8.

The in-cylinder pressure curve ICPC can be also affected by a noise N2 located at the end of the compression stroke, as shown in FIG. 7. Such noise N2 would generate an upward fake spike FS2 on the cumulative heat release curve CHRC of FIG. 9, whose superior vertex corresponds to the maximum value My of the cumulative heat release curve CHRC, to thereby introducing an error in calculating the target value Tv, and therefore a deviation of the determined index with respect to the real one.

Figure 10:
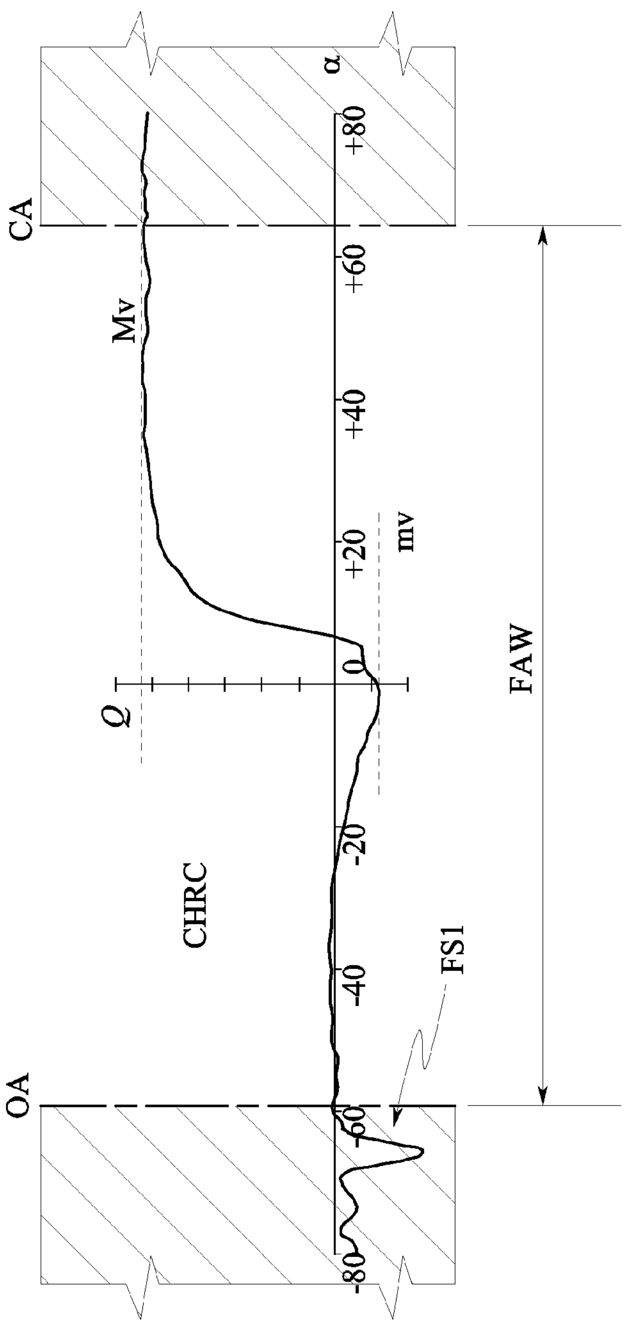
FIG. 10 and FIG. 11 illustrate several steps of a method according to an embodiment of the invention with reference respectively to the cumulative heat release curve of FIG. 6, and on the cumulative heat release curve of FIG. 9.
Figure 11:
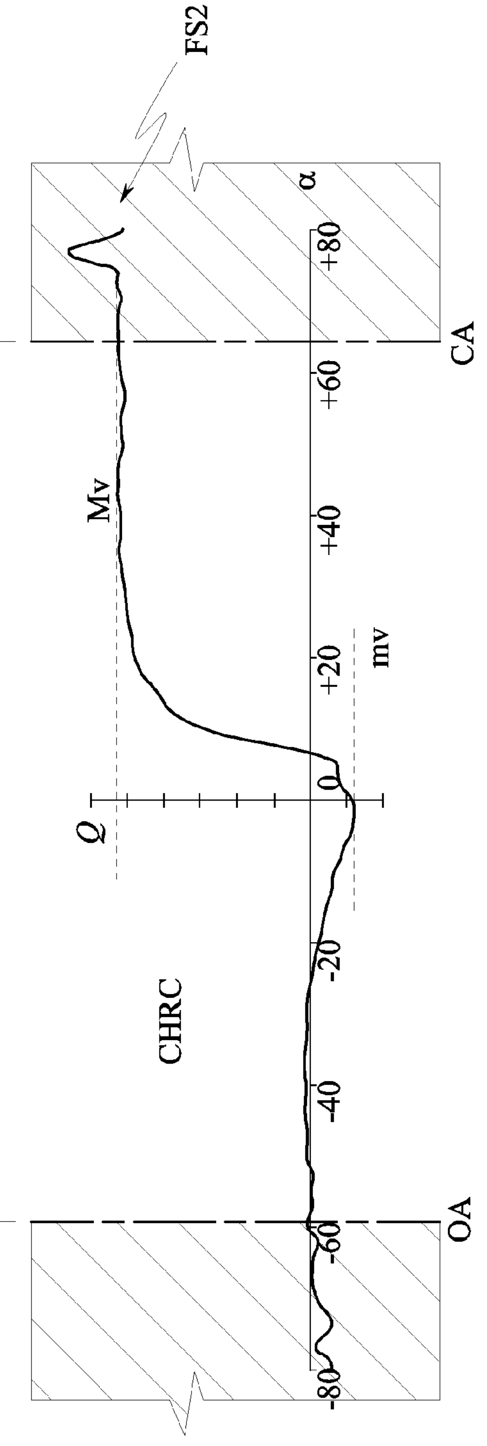

In order to disregards fake spikes such as FS1 and FS2, the method provides for limiting the determination of the minimum value my and maximum values My of the cumulative heat release curve CHRC within a first angular window FAW, as shown in FIGS. 10 and 11. Such first angular windows FAW is delimited between an opening angle OA, which is located within the crank angular range corresponding to compression stroke of the engine cycle, and a closing angle CA within the crank angular range corresponding to the expansion stroke of the engine cycle.

Preferably, the opening angle OA shall be as late as possible but before the start of the first fuel injection, and the closing angle CA shall be as early as possible but after the end of the last fuel injection. According to an embodiment of the invention, the opening angle OA and/or the closing angle CA and/or the width of the first angular window FAW, can be regulated on the base of one or more engine operating parameters, such as for example engine speed and engine load. As a matter of fact, the opening angle OA and/or the closing angles CA and/or the width of first angular window FAW, can be empirically evaluated during a calibration activity, to thereby being memorized in data sets or maps which respectively correlate the opening angle OA, the closing angle CA and the width of first angular window FAW, to said one or more engine operating parameters. Afterwards, these empirically determined data sets or maps can be used in the method of the invention, for determining the opening angle OA and/or the closing angle CA and/or the width of first angular window FAW, on the base of the actual values of said one or more engine operating parameters.

Figures 12, 13, 14:
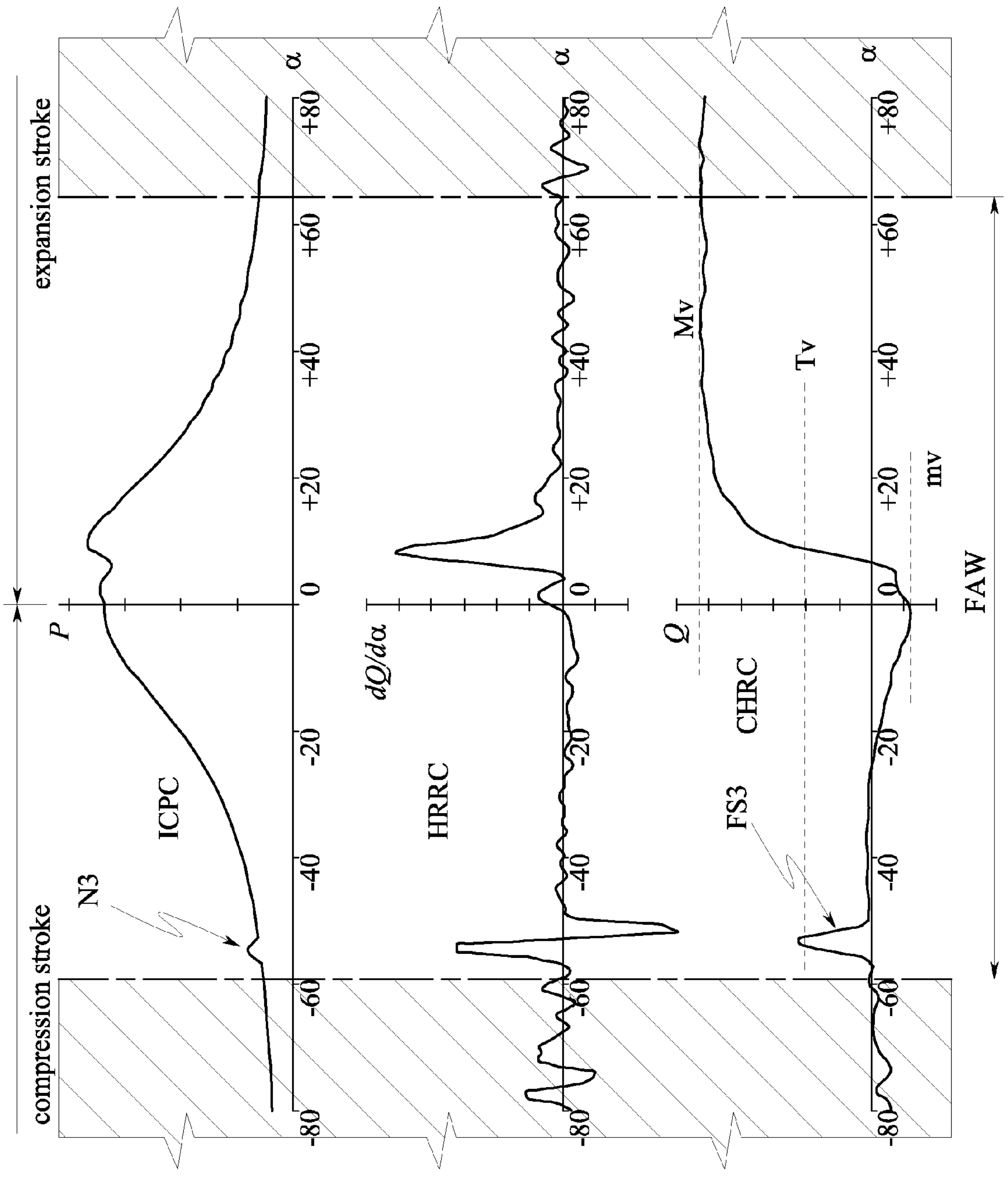
FIG. 12 shows an in-cylinder pressure curve of a Diesel engine cylinder affected by a noise located within the first angular window FAW.
FIG. 13 shows the heat release rate curve corresponding to the in-cylinder pressure curve of FIG. 12.
FIG. 14 shows the cumulative heat release curve corresponding to the heat release rate curve of FIG. 13.

As shown in FIGS. 12-14, it would happen that a noise N3 generates an upward fake spike FS3 located in the cumulative heat release curve CHRC within the first angular windows FAW. Even if the fake spikes FS3 does not affect the determination of the minimum and maximum values, it can provide the cumulative heat release curve CHRC with several points which correspond to the target value Tv, to thereby introducing uncertainty in the decision about which point should be considered as the right goal point GP.

Figure 15:
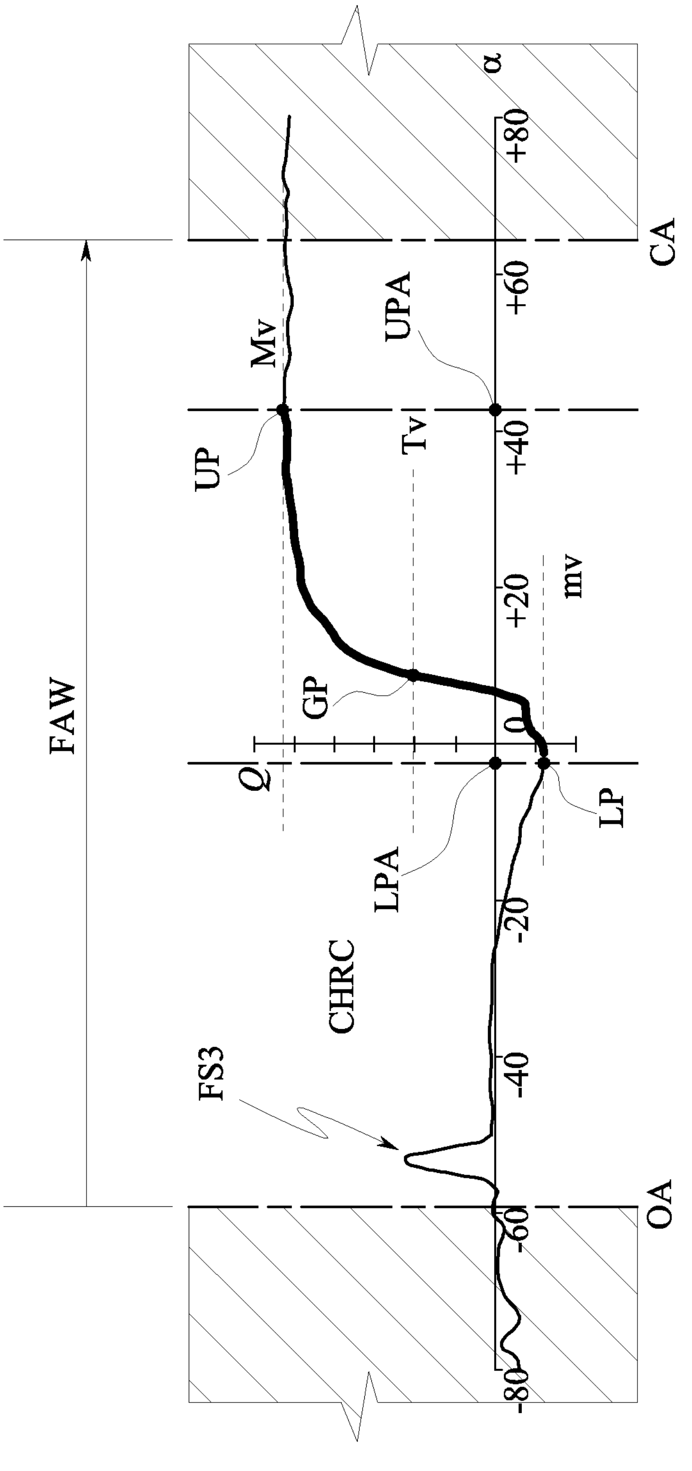
FIG. 15 illustrates further steps of the method with reference to the cumulative heat release curve of FIG. 14.

In order to solve this drawback (see FIG. 15), the method provide for determining a lower point LP of said cumulative heat release curve CHRC which corresponds to said determined minimum value my, determining an upper point UP of said cumulative heat release curve CHRC which corresponds to said determined maximum value My, and limiting the finding of the goal point GP within the portion of the cumulative heat release curve CHRC which is comprised between the lower point LP and the upper point UP (bold line).

According to the method, the determination of the lower point LP and the upper point UP can also be used to perform a plausibility check of the cumulative heat release curve CHRC. As a matter of fact (see FIG. 15), such plausibility check comprises the steps of determining the crank angle LPA corresponding to the lower point LP of the cumulative heat release curve CHRC, determining the crank angle UPA corresponding to said upper point UP of the cumulative heat release curve CHRC, and checking whether the crank angle LPA corresponding to said lower point LP precede the crank angle UPA corresponding to said upper point UP or not.

If the crank angle LPA corresponding to lower point LP does not precede the crank angle UPA corresponding to upper point UP, it means that the determined cumulative heat release curve is wrong, since it is not theoretically plausible that the heat release decreases during the fuel combustion. In this latter case, the method preferably provides for aborting the normal determination of the index and for performing instead a special procedure.

Such special procedure can assign to the index I a default crank angle, or can assign to the index I the crank angle at which the same given fuel mass fraction has been burnt in the cylinder during a previous engine cycle.

Figures 16, 17, 18:
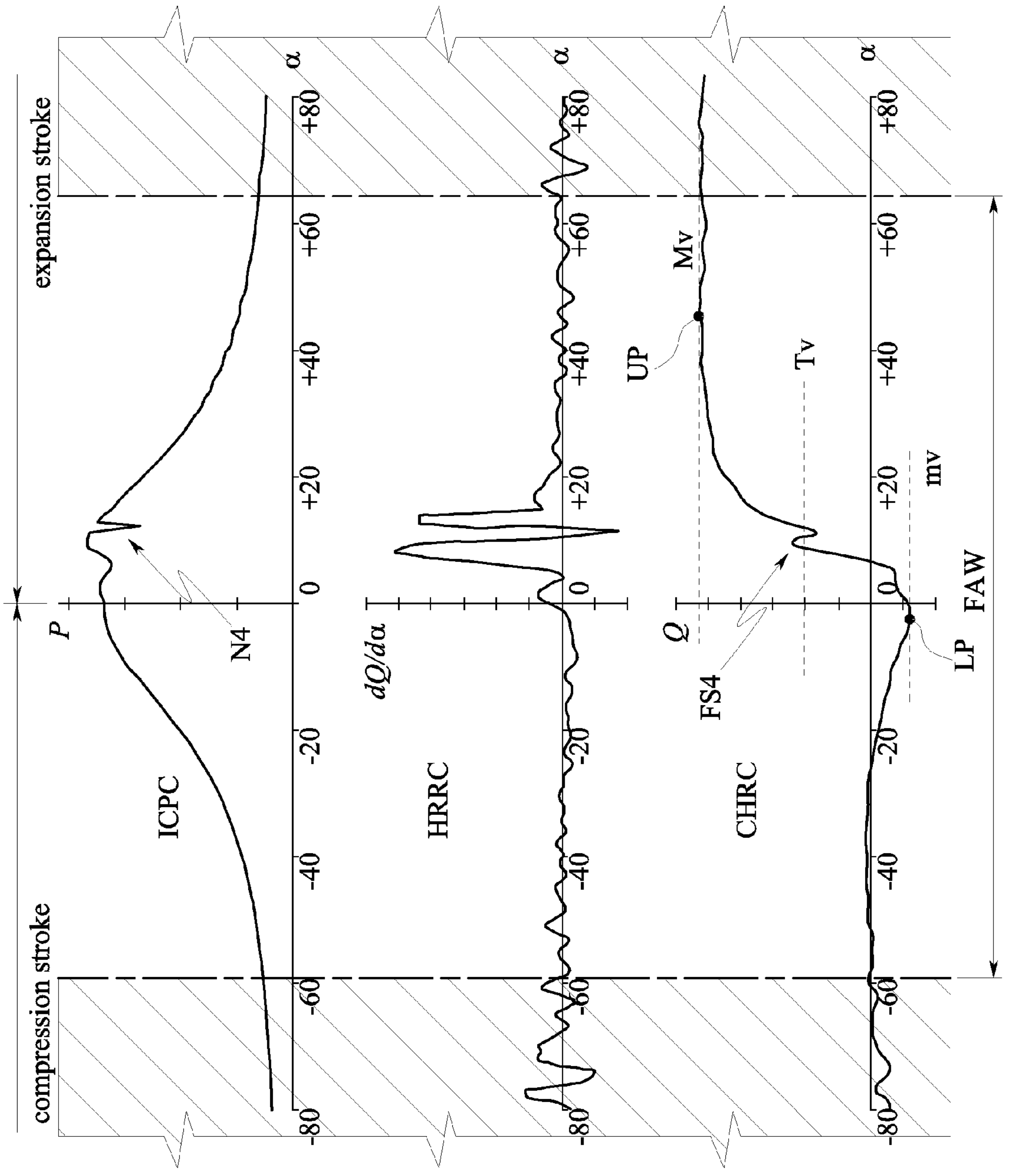
FIG. 16 shows an in-cylinder pressure curve of a Diesel engine cylinder affected by a noise located within the angular range comprised between the lower and the upper point of the cumulative heat release curve.
FIG. 17 shows the heat release rate curve corresponding to the in-cylinder pressure curve of FIG. 16.
FIG. 18 shows the cumulative heat release curve corresponding to the heat release rate curve of FIG. 17.

As shown in FIGS. 16-18, it would happen that a noise N4 generates an upward fake spike FS4 located in the cumulative heat release curve CHRC between the lower point LP and the upper point UP, and in correspondence of the target value Tv. In this case, it is not possible to completely disregard the fake spike FS4, but it would be useful to at least avoid the uncertainty in the decision about which points should be considered as the goal point GP. In order to meet this purpose, the method uses the determination of the lower point LP and the upper point UP for finding the goal point GP.

Figure 19:
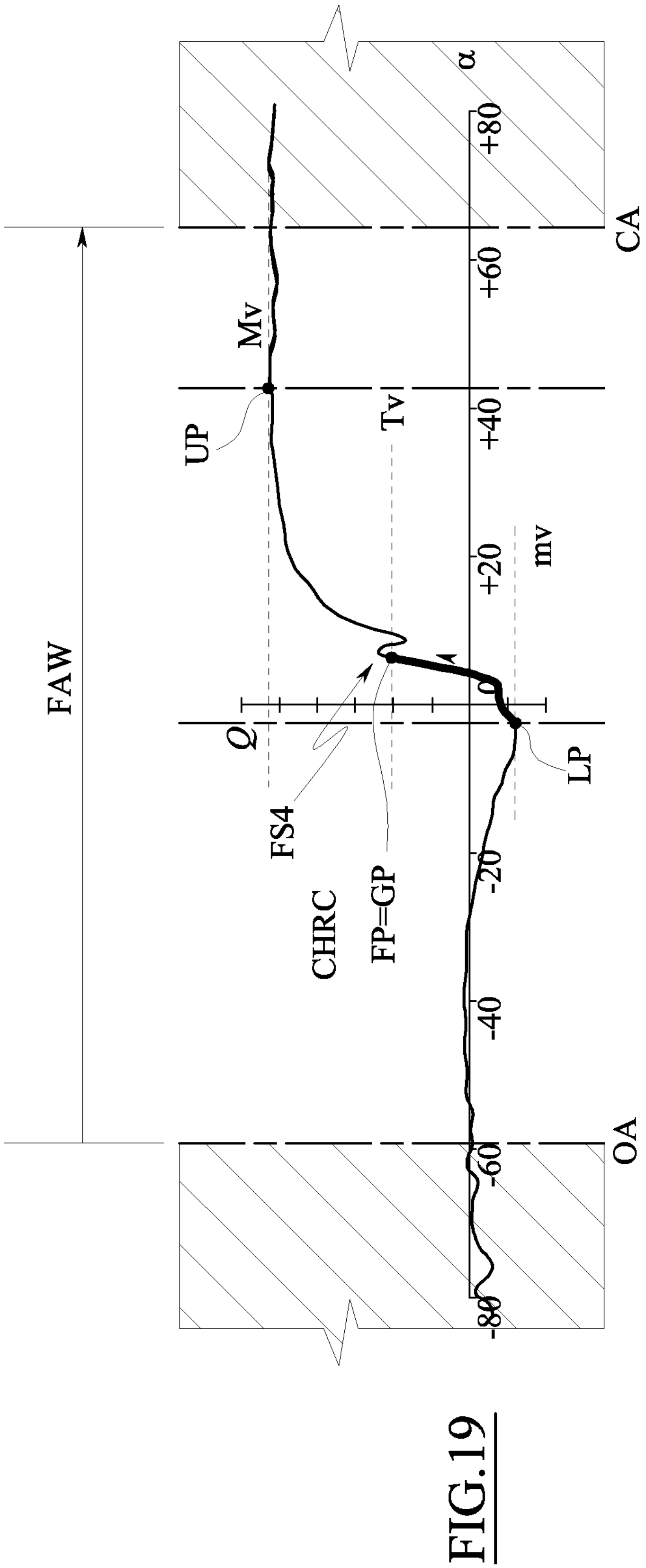
FIG. 19 illustrates further steps of the method with reference to the cumulative heat release curve of FIG. 18.

As a matter of fact (see FIG. 19), the goal point finding procedure comprises the step of evaluating the points of the cumulative heat release curve CHRC in sequence, starting from the lower point LP towards the upper point SP (see the arrow), determining the first point FP of the sequence which corresponds to the target value Tv, and assuming such first point FP as the goal point GP. This finding procedure is based on the assumption that the cumulative heat release curve is monotonic and increasing from the minimum to the maximum value, so that it provides the right goal point GP if no fake spike such as FS4 are present, otherwise it at least avoids the uncertainty in the decision about which points should be considered as the goal point GP.

Figures 20, 21, 22:
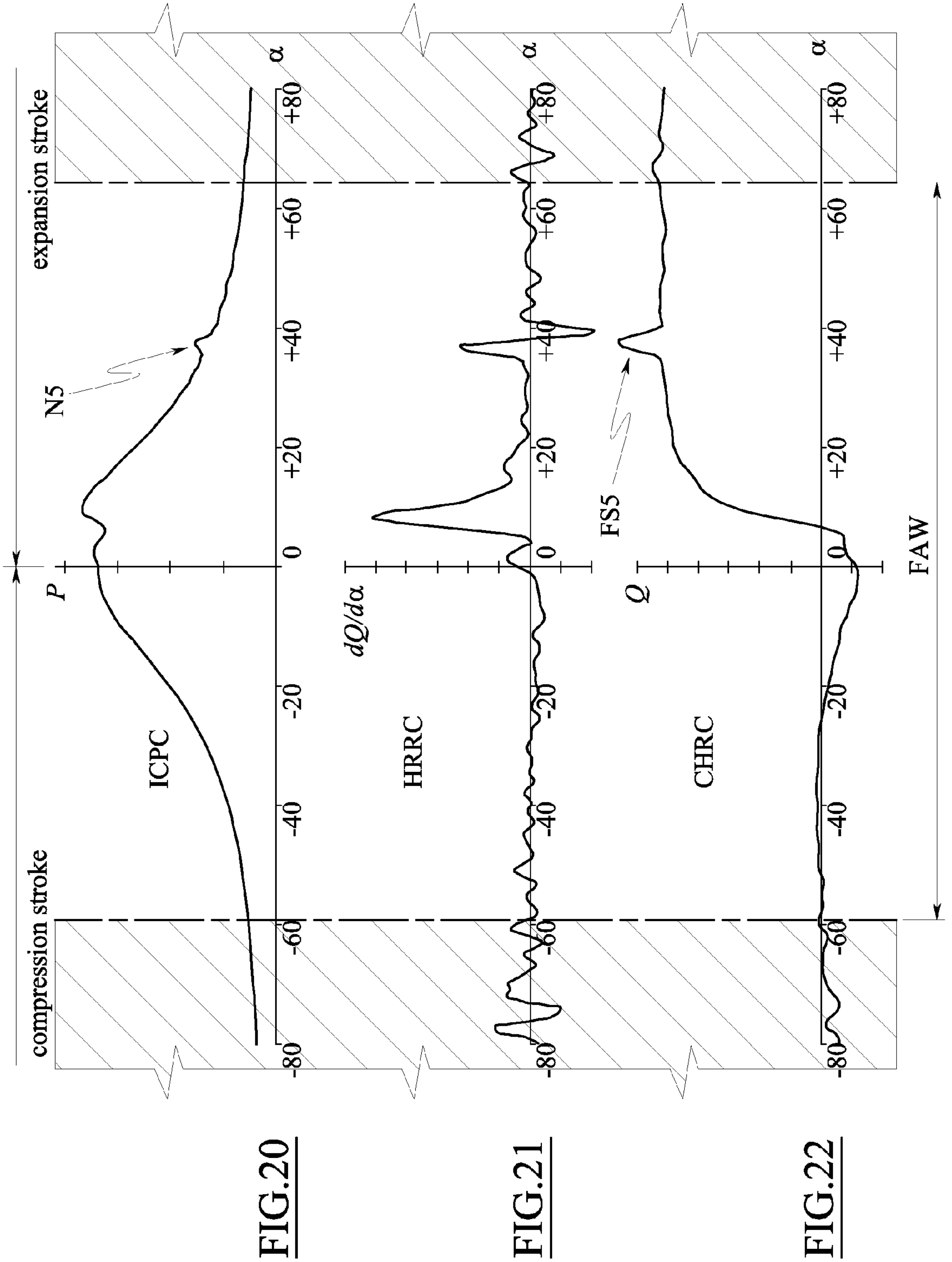
FIG. 20 shows an in-cylinder pressure curve of a Diesel engine cylinder affected by a noise located within the angular range comprised between the lower and the upper point of the cumulative heat release curve.
FIG. 21 shows the heat release rate curve corresponding to the in-cylinder pressure curve of FIG. 19.
FIG. 22 shows the cumulative heat release curve corresponding to the heat release rate curve of FIG. 20.

As shown in FIGS. 20-22, it would happen that a noise N5 generates an upwards fake spike FS5 which is located in the cumulative heat release curve CHRC within the first angular windows FAW, in a position where it affect the determination of the minimum and maximum value of the cumulative heat release curve CHRC. In this case, it is not possible to disregard the fake spike FS5, but it would be useful to at least know that the index I returned by the method will be wrong.

Figure 23:
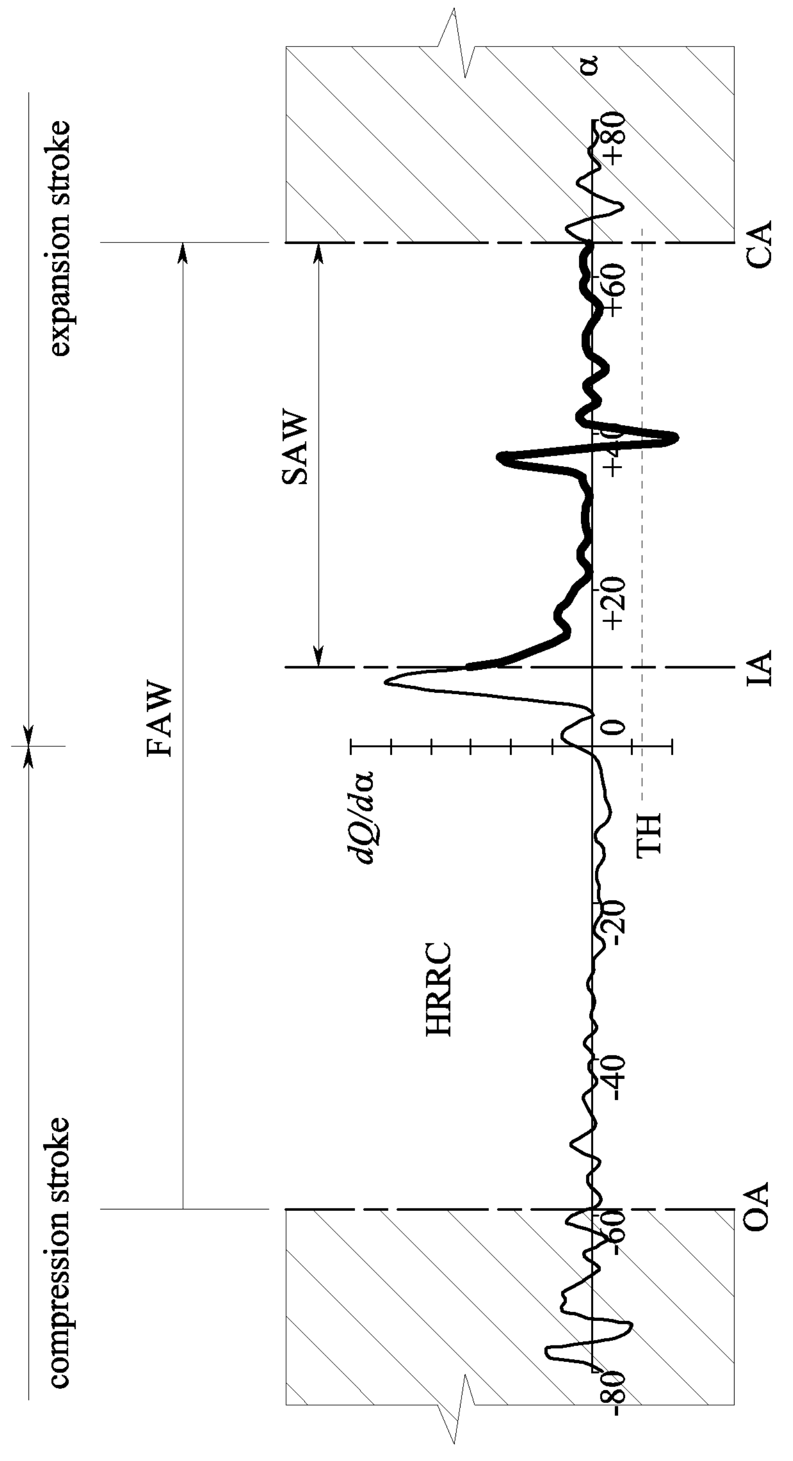
FIG. 23 illustrates further steps of the method with reference to the heat release rate curve of FIG. 21.

In order to meet this purpose (see FIG. 23), the method comprises the steps of determining an intermediate angle IA within the first angular window FAW and within the crank angular range corresponding to the expansion stroke of the engine cycle, using said intermediate angle IA and the closing angle CA of the first angular window FAW for delimiting between them a second angular window SAW, determining a not positive threshold TH for the heat release rate, evaluating the portion of the heat release rate curve HRRC comprised within said second angular window SAW (bold line), and checking whether at least one point of said portion of the heat release rate curve HRRC corresponds to a value beneath said not positive threshold TH.

If one or more points of said portion of the heat release rate curve HRRC correspond to values beneath said not positive threshold TH, it means that a heat release decrease has been happened within the second angular windows SAW. Since the second angular windows SAW corresponds to the fuel combustion phase, it is not plausible to have a heat release decrease in this phase. It follows that such heat release decrease must be due to a fake spike FS5 and that the determination of the index is probably affected by an error.

In this latter case, the method preferably provides for aborting the normal determination of the index and for performing instead a special procedure. Such special procedure can assign to the index I a default crank angle, or can assign to the index I the crank angle at which the same given fuel mass fraction has been burnt in the cylinder during a previous engine cycle.

According to another embodiment of the invention, the intermediate angle IA which defines the second angular window SAW, is comprised between the crank angle 0° (corresponding to the TDC between the compression stroke and expansion stroke of the engine cycle) and the closing angle CA of the first angular windows FAW. According to yet another embodiment of the invention, the intermediate angle IA and/or the not-positive threshold TH can be regulated on the base of one or more engine operating parameters, such as for example engine speed and engine load. As a matter of fact, the intermediate angle IA and/or the not-positive threshold TH can be empirically evaluated during a calibration activity, to thereby being memorized in data sets or maps which respectively correlate the intermediate angle IA and the not-positive threshold TH to said one or more engine operating parameters.

Afterwards, these empirically determined data sets or maps can be used in the method of the invention, for determining the intermediate angle IA and/or the not-positive threshold TH on the base of the actual values of said one or more engine operating parameters.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for determining an index representing a crank angle at which a given fuel mass fraction has been burnt in a cylinder of an engine during an engine cycle, the method comprising the steps of:

sampling a pressure within the cylinder during said engine cycle sensed by a pressure sensor;

using a processor to:

determine the heat release rate curve during said engine cycle with the pressure, determine the heat release rate curve for a cumulative heat release curve during said engine cycle;

determine a minimum value and a maximum value of said cumulative heat release curve;

calculate a target value of a cumulative heat release between said minimum value and said maximum value using the given fuel mass fraction;

identify a goal point of said cumulative heat release curve that corresponds to said target value;

assign the crank angle corresponding to said goal point as the index;

determine an opening angle within a crank angular range corresponding to compression stroke of said engine cycle;

determine a closing angle within the crank angular range corresponding to an expansion stroke of said engine cycle;

delimit between a first angular window using said opening angle and said closing angle; and limit said determination of the minimum value and the maximum value of the cumulative heat release curve within said first angular window.

2. The method according to claim 1, wherein said opening angle is before the start of a first fuel injection, and said closing angle is after an end of a last fuel injection.

3. The method according to claim 1, wherein said opening angle is before a spark angle, and said closing angle is after the spark angle.

4. The method according to claim 1, further comprising the steps of:

determining a lower point of said cumulative heat release curve which corresponds to said minimum value;

determining a upper point of said cumulative heat release curve that corresponds to said maximum value; and limiting said finding of the goal point within the portion of said cumulative heat release curve which is comprised between said lower point and the upper point.

5. The method according to claim 1, further comprising the steps of:

determining a lower point of said cumulative heat release curve the corresponds to said minimum value;

determining an upper point of said cumulative heat release curve which corresponds to said maximum value;

evaluating the points of said cumulative heat release curve in sequence from said lower point towards said upper point;

determining a first point of the sequence that corresponds to the target value; and assuming said first point as the goal point.

6. The method according to claim 1, further comprising the steps of:

determining a lower point of said cumulative heat release curve that corresponds to said minimum value;

determining an upper point of said cumulative heat release curve that corresponds to said maximum value;

determining the crank angle corresponding to said lower point of the cumulative heat release curve;

determining the crank angle corresponding to said upper point of the cumulative heat release curve; and performing a special procedure, if the crank angle corresponding to said lower point does not precede the crank angle corresponding to said upper point.

7. The method according to claim 1, wherein the further comprising the step of:

determining an intermediate angle within said first angular window and within the crank angular range corresponding to an expansion stroke of said engine cycle;

using said intermediate angle and the closing angle of the first angular window for delimiting between them a second angular window;

determining a not-positive threshold for a heat release rate;

evaluating the portion of said heat release rate curve comprised within said second angular window; and performing a special procedure, if at least one point of said portion of the heat release rate curve corresponds to a value beneath said not-positive threshold.

8. The method according to claim 6, wherein said special procedure comprises assigning to the index a default crank angle.

9. The method according to claim 7, wherein said special procedure comprises assigning to the index the crank angle at which the given fuel mass fraction has been burnt in the cylinder during a previous engine cycle.

10. The method according to claim 1, further comprising repeating the steps for each engine cycle during a function of the engine.

11. An apparatus for determining an index representing a crank angle at which a given fuel mass fraction has been burnt in a cylinder of an engine during an engine cycle, comprising:

a pressure sensor adapted to sample a pressure within the cylinder during said engine cycle; and a processor adapted to receive the pressure from the pressure sensor, the processor further adapted to:

determine the heat release rate curve during said engine cycle with the pressure, determine the heat release rate curve for a cumulative heat release curve during said engine cycle;

determine a minimum value and a maximum value of said cumulative heat release curve;

calculate a target value of a cumulative heat release between said minimum value and said maximum value using the given fuel mass fraction;

identify a goal point of said cumulative heat release curve that corresponds to said target value;

assign the crank angle corresponding to said goal point as the index;

determine an opening angle within a crank angular range corresponding to compression stroke of said engine cycle;

determine a closing angle within the crank angular range corresponding to an expansion stroke of said engine cycle;

delimit between a first angular window using said opening angle and said closing angle; and limit said determination of the minimum value and the maximum value of the cumulative heat release curve within said first angular window.

12. The apparatus according to claim 11, wherein said opening angle is before the start of a first fuel injection, and said closing angle is after an end of a last fuel injection.

13. The apparatus according to claim 11, wherein said opening angle is before a spark angle, and said closing angle is after the spark angle.

14. The apparatus according to claim 11, said processor further adapted to:

determine a lower point of said cumulative heat release curve that corresponds to said minimum value;

determine a upper point of said cumulative heat release curve that corresponds to said maximum value; and limit said finding of the goal point within the portion of said cumulative heat release curve which is comprised between said lower and said upper point.

15. The apparatus according to claim 11, said processor further adapted to:

determine a lower point of said cumulative heat release curve corresponds to said minimum value;

determine an upper point of said cumulative heat release curve which corresponds to said maximum value;

evaluate the points of said cumulative heat release curve in sequence from said lower point towards said upper point;

determine a first point of the sequence that corresponds to the target value; and assume said first point as the goal point.

16. The apparatus according to claim 11, said processor further adapted to:

determine a lower point of said cumulative heat release curve that corresponds to said minimum value;

determine an upper point of said cumulative heat release curve that corresponds to said maximum value;

determine the crank angle corresponding to said lower point of the cumulative heat release curve;

determine the crank angle corresponding to said upper point of the cumulative heat release curve; and perform a special procedure, if the crank angle corresponding to said lower point does not precede the crank angle corresponding to said upper point.

17. The apparatus according to claim 11, said processor further adapted to:

determine an intermediate angle within said first angular window and within the crank angular range corresponding to the expansion stroke of said engine cycle;

use said intermediate angle and the closing angle of the first angular window for delimiting between them a second angular window;

determine a not-positive threshold for a heat release rate;

evaluate the portion of said heat release rate curve comprised within said second angular window; and perform a special procedure, if at least one point of said portion of the heat release rate curve corresponds to a value beneath said not-positive threshold.

18. The apparatus according to claim 17, wherein said special procedure comprises assigning to the index a default crank angle.

19. The apparatus according to claim 11, said processor further adapted to repeat for each engine cycle during a functioning of the engine.

20. A computer readable medium embodying a computer program product, said computer program product comprising:

a program for determining an index representing a crank angle at which a given fuel mass fraction has been burnt in a cylinder of an engine during an engine cycle, the program configured to:

sample a pressure within the cylinder during said engine cycle;

determine the heat release rate curve during said engine cycle with the pressure, determine the heat release rate curve for a cumulative heat release curve during said engine cycle;

determine a minimum value and a maximum value of said cumulative heat release curve;

calculate a target value of a cumulative heat release between said minimum value and said maximum value using the given fuel mass fraction;

identify a goal point of said cumulative heat release curve that corresponds to said target value;

assign the crank angle corresponding to said goal point as the index;

determine an opening angle within a crank angular range corresponding to compression stroke of said engine cycle;

determine a closing angle within the crank angular range corresponding to an expansion stroke of said engine cycle;

delimit between a first angular window using said opening angle and said closing angle; and limit said determination of the minimum value and the maximum value of the cumulative heat release curve within said first angular window.

* * * * *